US009777768B2

(12) United States Patent
Mochizuki et al.

(10) Patent No.: US 9,777,768 B2
(45) Date of Patent: Oct. 3, 2017

(54) MOVEMENT DEVICE

(71) Applicant: THK CO., LTD., Tokyo (JP)

(72) Inventors: Hiroaki Mochizuki, Tokyo (JP);
Hiroomi Kuribayashi, Tokyo (JP);
Akito Kaneko, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/309,288

(22) PCT Filed: May 15, 2015

(86) PCT No.: PCT/JP2015/064077
§ 371 (c)(1),
(2) Date: Nov. 7, 2016

(87) PCT Pub. No.: WO2015/174528
PCT Pub. Date: Nov. 19, 2015

(65) Prior Publication Data
US 2017/0074318 A1     Mar. 16, 2017

(30) Foreign Application Priority Data
May 15, 2014   (JP) ................................ 2014-101678

(51) Int. Cl.
*F16C 29/06*        (2006.01)
(52) U.S. Cl.
CPC .......... *F16C 29/0623* (2013.01); *F16C 29/06* (2013.01); *F16C 29/0609* (2013.01)
(58) Field of Classification Search
CPC ................................................ F16C 29/0609
See application file for complete search history.

(56) References Cited

U.S. PATENT DOCUMENTS

| 4,557,532 A | 12/1985 | Teramachi |
| 6,682,218 B2 * | 1/2004 | Ishihara ................ F16C 29/063 384/45 |

(Continued)

FOREIGN PATENT DOCUMENTS

| JP | 59-208218 A | 11/1984 |
| JP | 1-44925 B2 | 10/1989 |

(Continued)

OTHER PUBLICATIONS

International Search Report dated Jul. 21, 2015, issued in counterpart International Application No. PCT/JP2015/064077, w/English translation (4 pages).

*Primary Examiner* — Thomas R. Hannon
(74) *Attorney, Agent, or Firm* — Westerman, Hattori, Daniels & Adrian, LLP

(57) ABSTRACT

A movement device includes: a track body; and a moving body which includes: a plurality of endless circulation passages; and a roller configured to roll in the plurality of endless circulation passages, the moving body being movable relative to the track body via the roller disposed between the track body and the moving body. The moving body further includes: a moving body main body in which inner peripheral portions of roller direction-change passages configuring the adjacent endless circulation passages are formed to be adjacent to each other on an end surface in a movement direction in which the moving body moves; and a cover body which is attached to the end surface of the moving body main body and in which outer peripheral portions of roller direction-change passages configuring the adjacent endless circulation passages are formed to be adjacent to each other.

6 Claims, 12 Drawing Sheets

(56) References Cited

U.S. PATENT DOCUMENTS

| | | | | |
|---|---|---|---|---|
| 7,585,112 B2* | 9/2009 | Hsu | ............... | F16C 29/0647 |
| | | | | 384/45 |
| 8,882,352 B2* | 11/2014 | Aoki | ............... | F16C 29/0642 |
| | | | | 384/45 |
| 9,234,544 B2* | 1/2016 | Hsieh | ............... | F16C 33/6674 |
| 2006/0231335 A1* | 10/2006 | Lin | ............... | F16C 29/0609 |
| | | | | 184/5 |

FOREIGN PATENT DOCUMENTS

| | | |
|---|---|---|
| JP | 3-144114 A | 6/1991 |
| JP | 5-44724 A | 2/1993 |
| JP | 9-42283 A | 2/1997 |
| JP | 2004-36786 A | 2/2004 |
| JP | 2008-275069 A | 11/2008 |
| JP | 2012-82879 A | 4/2012 |

* cited by examiner

MOVEMENT DEVICE

TECHNICAL FIELD

The present invention relates to a movement device.

BACKGROUND ART

A movement device such as a linear guide includes a track body, a moving body, and a roller. The moving body includes a load roller rolling passage, a no-load roller rolling passage, and a roller direction-change passage.

The moving body is formed by mounting a cover body on both end surfaces of a moving body main body. The roller endlessly circulates between the track body and the moving body, and the track body and the moving body move relative to each other.

Priority is claimed on Japanese Patent Application No. 2014-101678, filed May 15, 2014, the content of which is incorporated herein by reference.

Roller direction-change passages are formed in both the moving body main body and the cover body in the moving body. The following Patent Document 1 discloses a moving body in which an inner peripheral portion of a roller direction-change passage is formed on an end surface of a moving body main body and an outer peripheral portion of the roller direction-change passage is formed in a cover body mounted on the end surface.

PRIOR ART DOCUMENTS

Patent Documents

[Patent Document 1] Japanese Examined Patent Application, Second Publication No. H1-44925

DISCLOSURE OF INVENTION

Problem to be Solved by Invention

Mating surfaces of the inner peripheral portion and the outer peripheral portion of the roller direction-change passage disclosed in Patent Document 1 are flat surfaces. Accordingly, when the moving body is assembled, it is necessary to perform positioning adjustment between the moving body main body and the cover body, and much time is required to perform the assembly. In addition, for example, in a case where multiple members are connected to each other to form a track body, the connection portions are chamfered, and corners which become steps are rounded. Accordingly, if the roller collides with the chamfered portions, there is a concern that positional deviation between the moving body main body and the cover body may occur due to a great collision load generated at the time of the collision. Particularly, in the case of a small movement device, the cover body is attached to the end surface of the moving body main body using only one bolt, and the position of the cover body may easily deviate in a direction in which the cover body rotates about the bolt of the moving body.

An object of the present invention is to provide a movement device capable of improving assembling characteristics of a moving body and preventing positional deviation between a moving body main body and a cover body when the movement device receives a collision load or the like.

Means for Solving the Problems

A movement device according to an aspect of the present invention includes: a track body; and a moving body which includes: a plurality of endless circulation passages; and a roller configured to roll in the plurality of endless circulation passages, the moving body being movable relative to the track body via the roller disposed between the track body and the moving body. The moving body further includes: a moving body main body in which inner peripheral portions of roller direction-change passages configuring the adjacent endless circulation passages are formed to be adjacent to each other on an end surface in a movement direction in which the moving body moves; and a cover body which is attached to the end surface of the moving body main body and in which outer peripheral portions of roller direction-change passages configuring the adjacent endless circulation passages are formed to be adjacent to each other. The moving body main body and the cover body are positioned by engaging a positioning portion provided between the adjacent inner peripheral portions of the moving body main body with a positioning portion between the adjacent outer peripheral portions of the cover body.

Effects of the Invention

According to the movement device of the aspect of the present invention, it is possible to improve assembling characteristics of the moving body, and it is possible to prevent positional deviation between the moving body main body and the cover body when the movement device receives a collision load or the like.

EMBODIMENTS FOR CARRYING OUT THE INVENTION

A linear guide 1 according to an embodiment of the present invention will be described with reference to the drawings.

Figure 1:
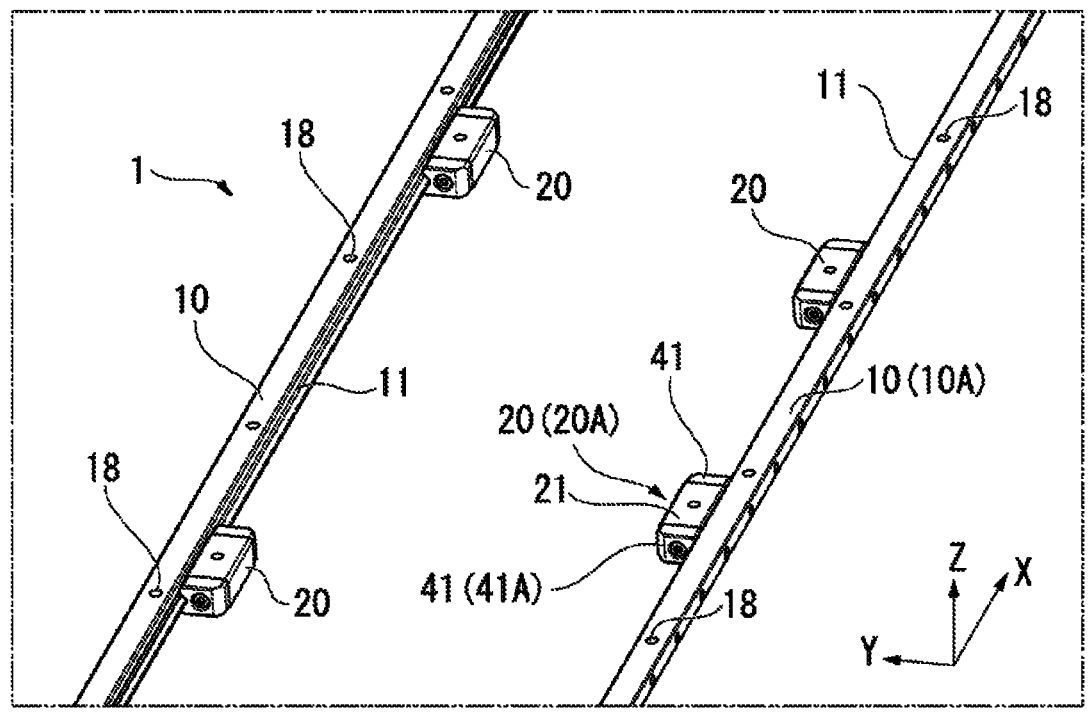
FIG. 1 is perspective view showing a linear guide 1 according to an embodiment of the present invention.

FIG. 1 is a perspective view showing the linear guide 1 according to the embodiment of the present invention.

Figure 2:
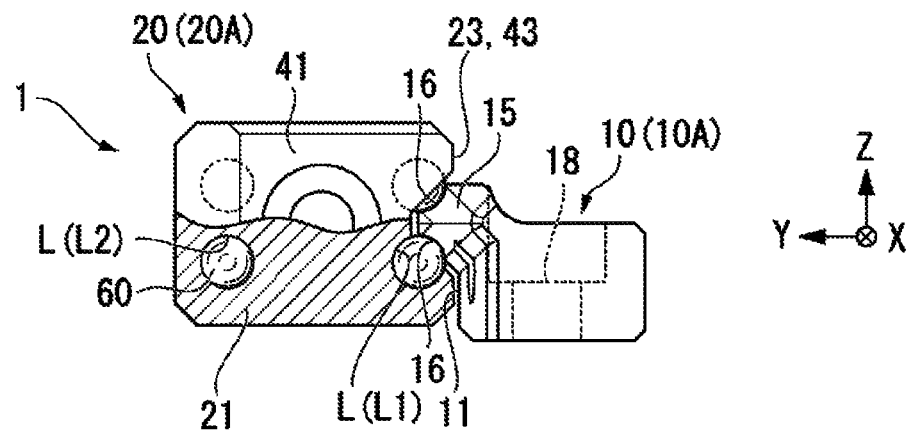
FIG. 2 is a front view (a partially section view) showing the linear guide 1.

FIG. 2 is a front view (a partially sectional view) showing the linear guide 1.

The linear guide (movement device) 1 includes a track rail 10 and a slider 20. In addition, in the following present embodiment, the linear guide (movement device) 1 which includes a pair of track rails 10 and multiple (four) sliders 20 is described. However, the number of the track rails 10 and the sliders 20 may be appropriately modified according to the use or the like.

Four sliders 20 are mounted on the pair of track rails 10 so as to be movable relative to the track rails 10 along the pair of track rails 10. Two sliders 20 are mounted on one track rail 10. Four sliders 20 are connected to each other via a connection member or the like (not shown).

A direction (movement direction of the slider 20) in which the track rail 10 extends is referred to as an X direction. A direction in which the track rail 10 and the slider 20 overlap each other is referred to as a Y direction (thickness direction). A direction perpendicular to the X direction and the Y direction is referred to as a Z direction (width direction). The X direction, the Y direction, and the Z direction are perpendicular to each other.

The center of the slider 20 in the X direction indicates the direction which is toward a screw hole 33 of the block 21, and the outside of the slider 20 in the X direction indicates the direction which is separated from the screw hole 33 of the block 21.

The center of the slider 20 in the Y direction or the Z direction is the direction which is toward the screw hole 32 of the block 21, and the outside of the slider 20 in the Y direction or the Z direction indicates the direction which is separated from the screw hole 32 of the block 21.

Figure 3A:
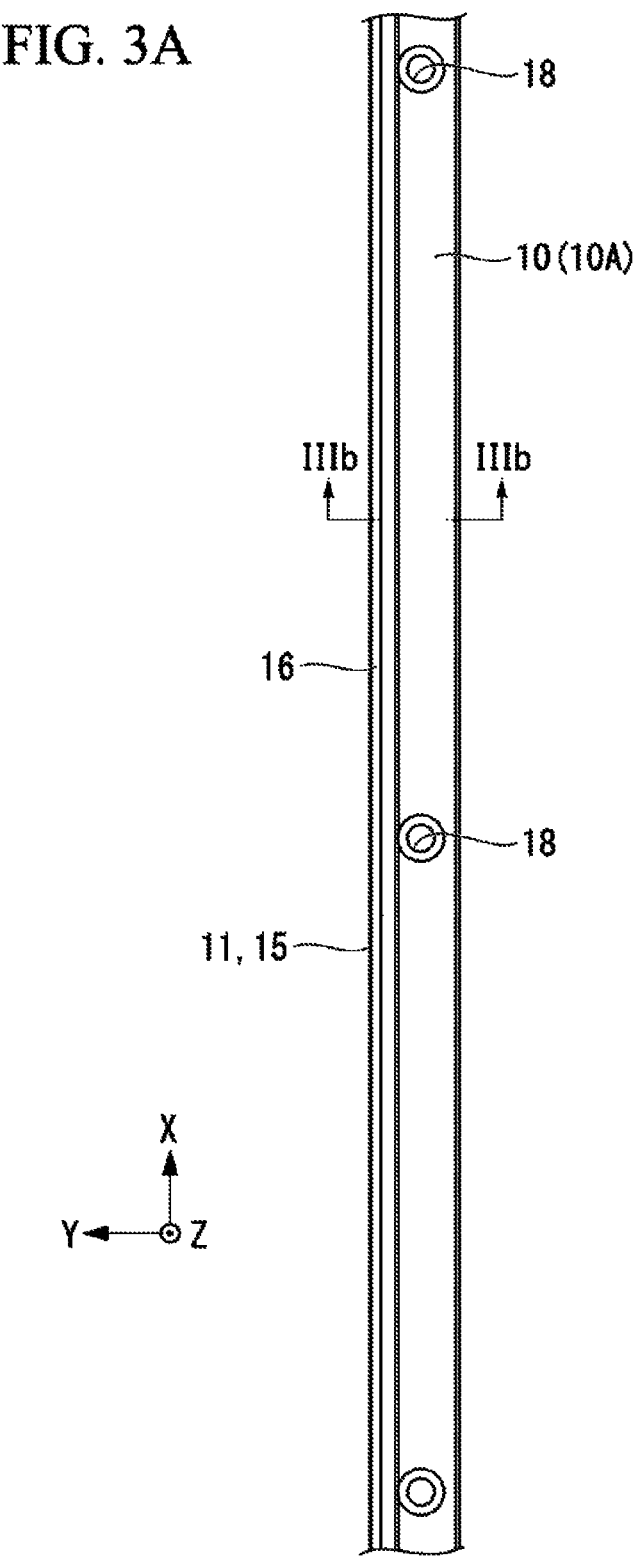
FIG. 3A is a top view showing a track rail 10.
Figure 3B:
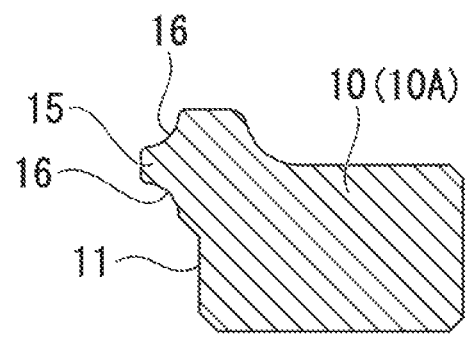
FIG. 3B is a sectional view taken along line IIIb-IIIb of the track rail 10 of FIG. 3A.
Figure 3B:
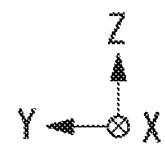

FIG. 3A is a top view showing the track rail 10, and FIG. 3B is a sectional view taken along line IIIb-IIIb of the track rail 10 of FIG. 3A.

The pair of the track rails 10 have a shape which is linearly symmetrical in the X direction. Hereinafter, a track rail 10A (refer to FIG. 1) of the pair of track rails 10 will be described.

The track rail (track body) 10 is a steel member which extends in the X direction, and a cross-section of the track rail 10 perpendicular to the X direction is formed in an approximately rectangular shape.

A protrusion portion 15 which has an approximately triangular shape in a cross-section perpendicular to the X direction and protrudes in the +Y direction is provided on an inner surface 11 facing the +Y direction of the outer peripheral surfaces of the track rail 10A. A pair of roller rolling surfaces 16 extending in the X direction are provided on the protrusion portion 15. The pair of roller rolling surfaces 16 are formed so as to be back to back to each other at approximately 90° in the protrusion portion 15.

Multiple bolt attachment holes 18 penetrating the track rail 10A in the Z direction are provided with gaps in the X direction in the track rail 10A. The track rail 10A is fixed (installed) to a base member or the like (not shown) by bolts (not shown) inserted into the bolt attachment holes 18.

The two track rails 10 are installed to be parallel to each other such that the inner surfaces 11 face each other.

Figure 4A:
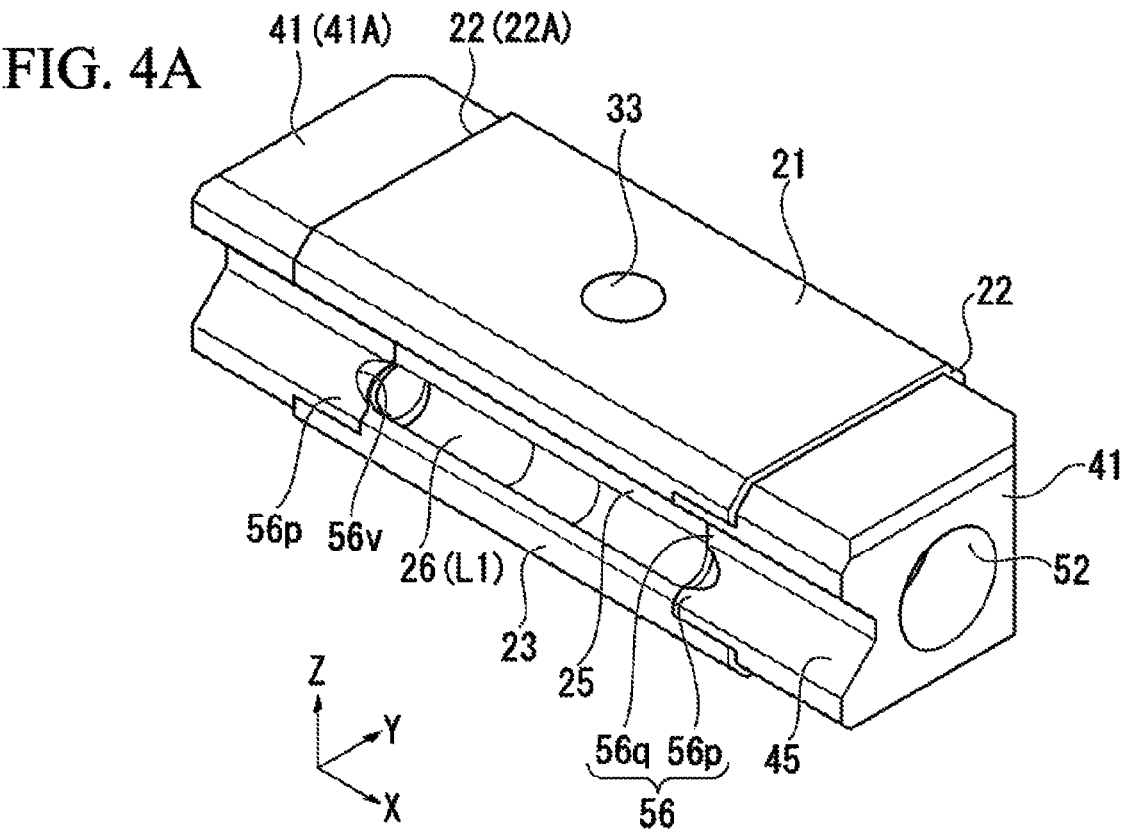
FIG. 4A is a perspective view showing a slider 20.
Figure 4B:
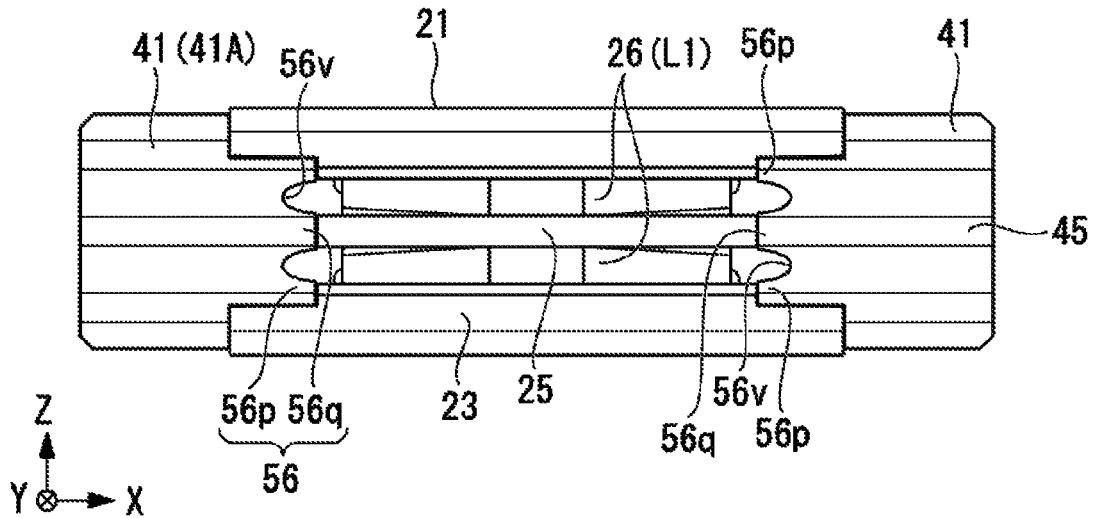
FIG. 4B is an inner side vide showing the slider 20.

FIG. 4A is a perspective view showing the slider 20, and FIG. 4B is an inner side view thereof.

Figure 5A:
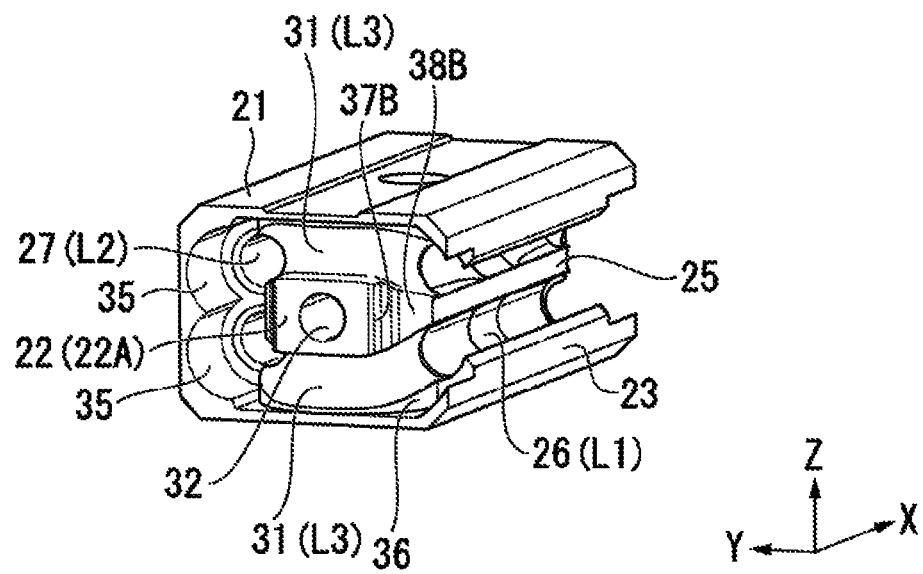
FIG. 5A is a perspective view showing a block 21.
Figure 5B:
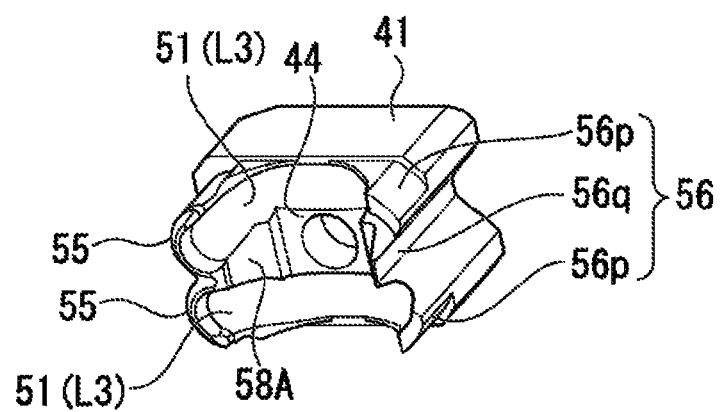
FIG. 5B is a perspective view showing an end plate 41.

FIG. 5A is a perspective view showing the block 21, and FIG. 5B is a perspective view showing the end plate 41.

Figure 6A:
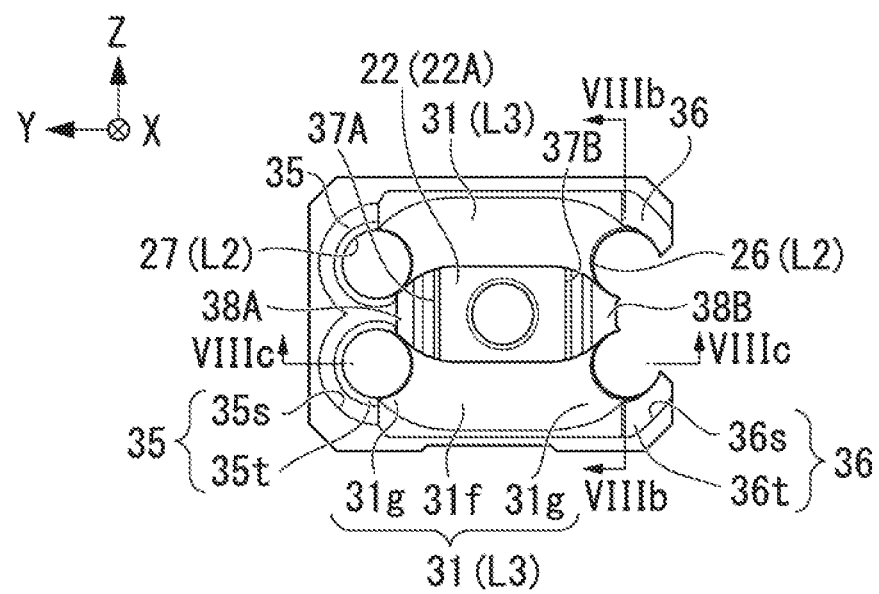
FIG. 6A is a front view showing the block 21.
Figure 6B:
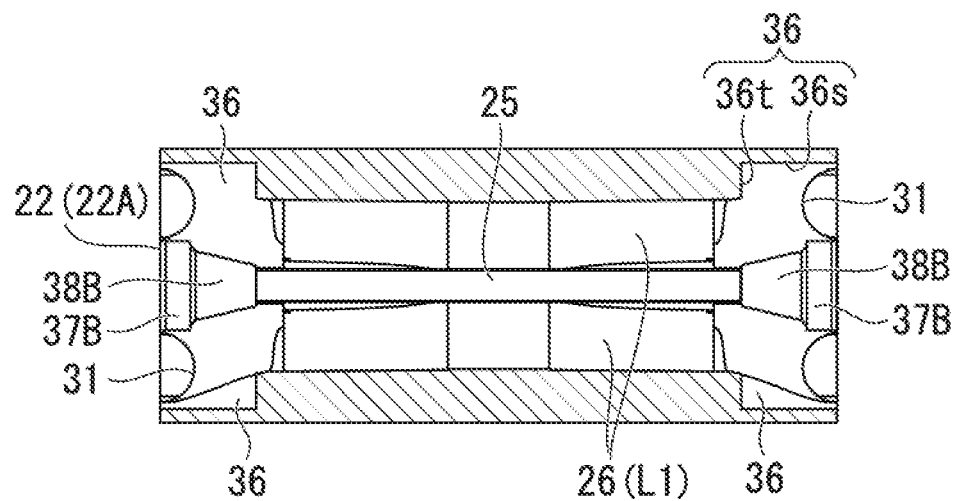
FIG. 6B is a sectional view taken along line VIIIb-VIIIb of the block 21 of FIG. 6A.
Figure 6C:
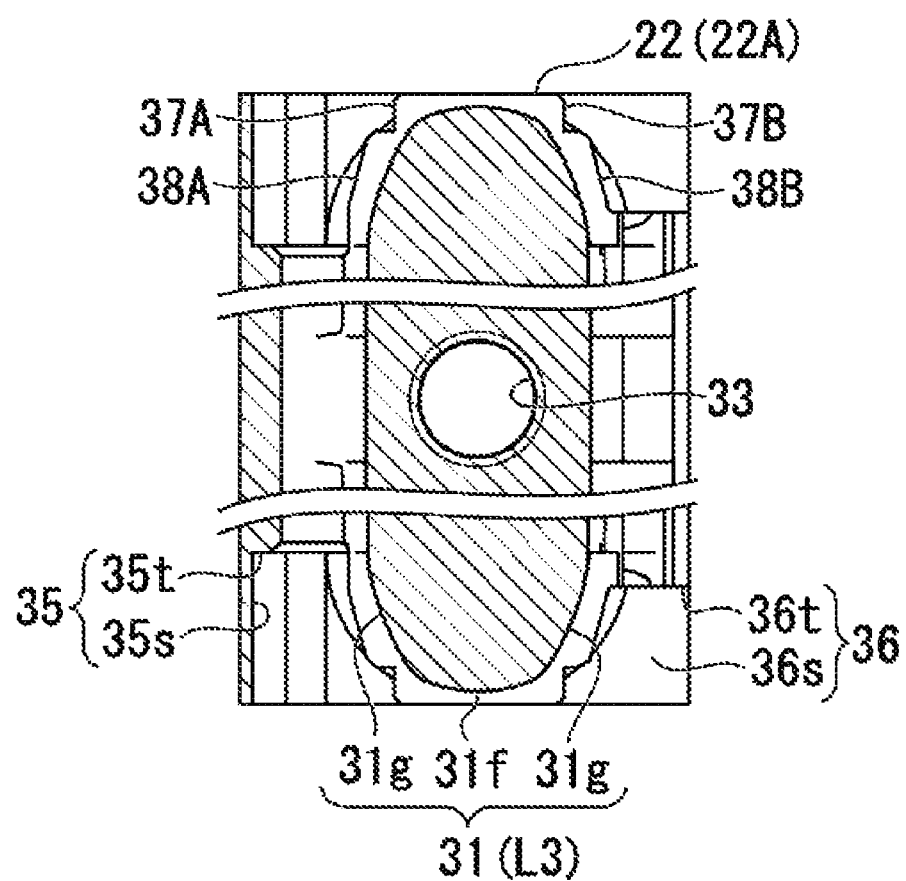
FIG. 6C is a sectional view taken along line VIIIc-VIIIc of the block 21 of FIG. 6A.

FIG. 6A is a front view showing the block 21, FIG. 6B is a sectional view taken along line VIIIb-VIIIb of the block 21 of FIG. 6A, and FIG. 6C is a sectional view taken along line VIIIc-VIIIc.

Figure 7A:
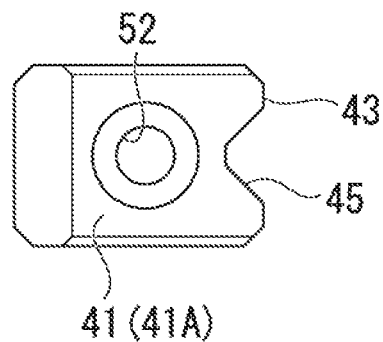
FIG. 7A is a front view showing the end plate 41.
Figure 7B:
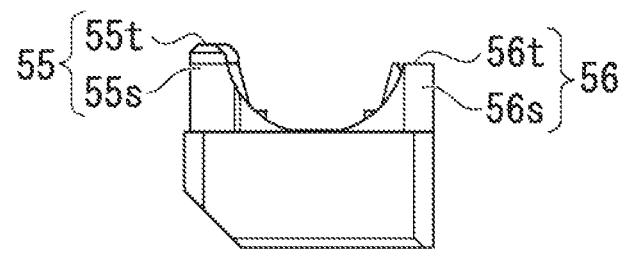
FIG. 7B is a top view showing the end plate 41.
Figure 7C:
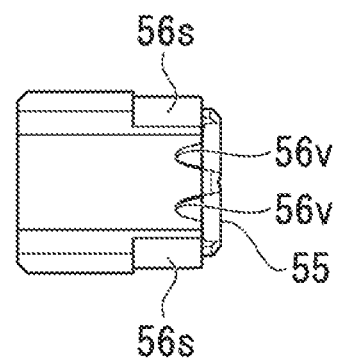
FIG. 7C is an inner side view showing the end plate 41.
Figure 7D:
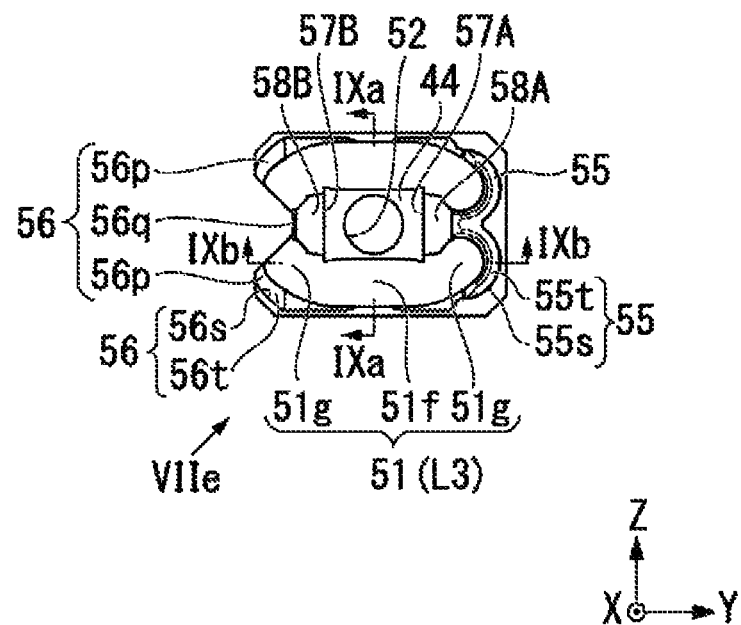
FIG. 7D is a rear view showing the end plate 41.
Figure 7E:
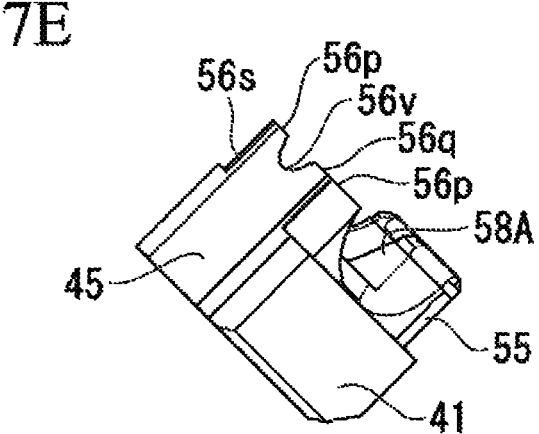
FIG. 7E is a view when the end plate 41 of FIG. 7D is viewed from arrow VIIe.

FIG. 7A is a front view showing the end plate 41, FIG. 7B is a top view thereof, FIG. 7C is an inner side view thereof, and FIG. 7D is a rear view thereof.

The four sliders (moving bodies) 20 have the same shape as each other. Hereinafter, a slider 20A (refer to FIG. 1) among the four sliders 20 will be described.

The pair of end plates 41 have the same shape as each other. Hereinafter, an end plate 41A (refer to FIGS. 4A and 4B) among the pair of end plates 41 will be described.

The slider 20 includes a rectangular parallelepiped block 21, the pair of end plates 41, or the like.

The pair of end plates 41 are attached to both end surfaces 22 of the block 21 in the X direction.

As shown in FIG. 2B, the slider 20 further includes multiple balls 60. Two endless circulation passages L which are endless oblong spaces or endless elliptical spaces are formed inside the slider 20. The multiple balls 60 are held so as to be rolled inside the two endless circulation passages L.

Each of the endless circulation passage L is configured of a pair of linear portions extending in the X direction, and a pair of semicircular curved portions which connects end portions of the pair of linear portions to each other. One of the linear portions is a load roller passage L1, and the other thereof is a no-load roller passage L2. The pair of semicircular curved portions are roller direction-change passages L3.

The block (moving body main body) 21 is a metal member extending in the X direction and has an approximately rectangular shape in a cross-section perpendicular to the X direction.

A recessed portion 25, which faces the protrusion portion 15 of the track rail 10 and is recessed in the +Y direction so as to have an approximately triangular shape in a cross-section perpendicular to the X direction, is provided on an inner surface 23 of the block 21 in the X direction. The protrusion portion 15 of the track rail 10 is disposed so as to have a slight gap with respect to the recessed portion 25.

A pair of roller rolling surfaces 26 extending in the X direction are provided on the recessed portion 25. The pair of roller rolling surfaces 26 are formed so as to be back to back to each other at approximately 90° in the recessed portion 25.

Two circular no-load roller passages L2 (through holes 27) extending in the X direction are formed so as to penetrate the block 21.

A direction-change passage inner peripheral surface (inner peripheral portion) 31, which is a portion of the roller direction-change passage L3, is formed on the end surface 22 of the block 21. The direction-change passage inner peripheral surface 31 is formed so as to continuously connect the roller rolling surface 26 (load roller passage L1) and the no-load roller passage L2 to each other.

If the slider 20 (block 21) is mounted on the track rail 10, the two roller rolling surfaces 16 of the track rail 10 and the two roller rolling surfaces 26 of the block 21 are disposed so as to face each other.

A space (a circular hole extending in the X direction) which is formed between each of the roller rolling surfaces 16 and each of the roller rolling surfaces 26 becomes the load roller passage L1.

The end plate (cover body) 41 is a flat-plated resin molded member and is fixed to the end surface 22 of the block 21.

Similarly to the block 21, the end plate 41 has an approximately rectangular shape in a cross-section perpendicular to the X direction. A recessed portion 45, which faces the protrusion portion 15 of the track rail 10 and is recessed in the +Y direction so as to have an approximately triangular shape in a cross-section perpendicular to the X direction, is provided on an inner surface 43 of the end plate 41 in the X direction. The protrusion portion 15 of the track rail 10 is disposed so as to have a slight gap with respect to the recessed portion 45.

A rear surface (facing surface) 44 of the end plate 41 is a surface which faces the end surface 22 of the block 21.

A direction-change passage outer peripheral surface (outer peripheral portion) 51 which is a portion of the roller direction-change passage L3 is formed on the rear surface 44.

If the end plate 41 is mounted on the block 21, the direction-change passage inner peripheral surface 31 of the block 21 and the direction-change passage outer peripheral surface 51 of the end plate 41 are overlapped so as to face each other. The direction-change passage outer peripheral surface 51 is coupled so as to continuously connect the load roller passage L1 and the no-load roller passage 12 of the block 21 to each other.

A space (a circular hole which is bent in a semicircular shape), which is formed of the direction-change passage inner peripheral surface 31 and the direction-change passage outer peripheral surface 51, becomes the roller direction-change passage L3.

A ball (roller) 60 is a metal spherical member. Multiple balls 60 are interposed between (load roller passage L1) the track rail 10 and the slider 20, and cause the slider 20 to smoothly move with respect to the track rail 10.

The multiple balls 60 are disposed inside the endless circulation passage L with almost no gaps, and circulate through the endless circulation passage L. The slider 20 is supported so as to be reciprocated along the track rail 10 via the multiple balls 60.

The shape of the block 21 will be described in detail.

The shape of the end surface 22 facing the +X direction is the same as the shape of the end surface 22 facing the −X direction. Hereinafter, the shape of an end surface 22A (refer to FIG. 5A) of the block 21 facing the −X direction will be described.

As shown in FIG. 6A, a screw hole 32 is provided on the center of the end surface 22A of the block 21. A bolt (not shown) is screwed to the screw hole 32 when the end plate 41A is attached.

Two no-load roller passages L2 (through holes 27) are open in the +Y direction of the end surface 22A so as to be arranged in the Z direction.

Two load roller passages L1 (roller rolling surfaces 26) are open in the −Y direction of the end surface 22A so as to be arranged in the Z direction. The two roller rolling surfaces 26 are open in an arc shape at an angle exceeding 180° on the end surface 22A.

Two direction-change passage inner peripheral surfaces 31 of the two roller direction-change passages L3 is opened (exposed) to the end surface 22A in the Y direction. The two direction-change passage inner peripheral surfaces 31 are formed so as to be linearly symmetrical on both side in the Z direction in a state where the screw hole 32 is interposed therebetween. The two discharge-change passage inner peripheral surfaces 31 are bent in arc shapes. Each of the two direction-change passage inner peripheral surfaces 31 includes a linear shape (inner peripheral surface 31f) at the center of the end surface 22A in the Y direction, and arc shapes (inner peripheral surfaces 31g) on the outer sides of the end surface 22A in the Y direction. The direction-change passage inner peripheral surface 31 is continuously connected to the through hole 27 and the roller rolling surface 26.

As shown in FIG. 6B, two load roller passages L1 (roller rolling surfaces 26) are linearly formed on the recessed portion 25 in the X direction.

The direction-change passage inner peripheral surface 31 (inner peripheral surface 31g) of the roller direction-change passage L3 is continuously connected to each of both ends of the roller rolling surfaces 26. The direction-change passage inner peripheral surface 31 (inner peripheral surface 31g) is gradually directed toward the outside in the Z direction as it is directed toward the outside in the X direction with respect to the recessed portion 25. That is, the two direction-change passage inner peripheral surfaces 31 are directed in the direction separated from each other.

As shown in FIG. 6C, the screw hole 33 is provided at the center of the block 21. A bolt (not shown) is screwed to the screw hole 33 when a connection member or the like (not shown) is attached to the block 21 (slider 20).

As shown in FIG. 6A, the no-load roller passage L2 (through hole 27) is linearly formed in the X direction in the +Y direction of the block 21.

The load roller passage L1 (roller rolling surface 26) is linearly formed in the X direction in the −Y direction of the block 21.

The direction-change passage inner peripheral surface 31 (inner peripheral surface 31g) of the roller direction-change passage L3 is continuously connected to each of both ends of the load roller passage L1 and the no-load roller passage L2. The direction-change passage inner peripheral surface 31 (inner peripheral surface 31g) is formed so as to be gradually directed toward the center (inner peripheral surface 31f) in the Y direction as it is directed toward the outside in the X direction.

In this way, when the direction-change passage inner peripheral surface 31 of the roller direction-change passage L3 is viewed in the Z direction, the direction-change passage inner peripheral surface 31 is formed in a semicircular curved shape which is continuously connected to the load roller passage L1 (roller rolling surface 26) and the no-load roller passage L2 (through hole 27).

When the direction-change passage inner peripheral surface 31 of the roller direction-change passage L3 is viewed in the X direction, the center (inner peripheral surface 31f) of the direction-change passage inner peripheral surface 31 is formed in a linear shape, and the outer side (inner peripheral surface 31g) thereof is curved in an arc shape.

As shown in FIG. 6A, a space (guide piece accommodation portion (circulation piece accommodation portion) 35) which is formed so as to be recessed from the end surface 22A in the X direction is provided outside the through hole 27 and the inner peripheral surface 31g.

The guide piece accommodation portion 35 is formed in a shape in which two arcs are connected to each other.

The guide piece accommodation portion 35 is a space in which the guide piece (circulation piece) 55 of the end plate 41 described below is accommodated.

As shown in FIG. 6C, since the guide piece accommodation portion 35 is formed along the inner peripheral surface 31g, the guide piece accommodation portion 35 is formed so as to be gradually cut more deeply in the X direction as it is directed toward the outside in the Y direction.

A sliding surface 35s is formed on the inner surface of the guide piece accommodation portion 35 so as to face the through hole 27. The sliding surface 35s abuts on (slides on) an outer surface (guide surface) 55s of the guide piece 55 of the end plate 41.

A bottom surface 35t perpendicular to the X direction is formed on the deepest portion of the guide piece accommodation portion 35. The bottom surface 35t faces a tip surface 55t of the guide piece 55 of the end plate 41.

As shown in FIG. 6A, a space (scooping piece accommodation portion (circulation piece accommodation portion) 36), which is formed from the end surface 22A in the +X direction, is provided outside the roller rolling surface 26 and the inner peripheral surface 31g. The scooping piece accommodation portion 36 is formed in a shape along the outer peripheral surface of the block 21.

The scooping piece accommodation portion 36 covers a scooping piece (circulation piece) 56 of the end plate 41 described below, and in the present embodiment, is provided as a recessed portion into which the scooping piece 56 is inserted.

As shown in FIG. 6B, the scooping piece accommodation portion 36 is provided outside the roller rolling surface 26 in the Z direction.

As shown in FIG. 6C, since the scooping piece accommodation portion 36 is formed along the inner peripheral surface 31g, the scooping piece accommodation portion 36 is formed so as to be gradually cut more deeply in the X direction as it is directed toward the outside in the Y direction.

A first abutment surface 36s facing the roller rolling surface 26 is formed on the inner surface of the scooping piece accommodation portion 36. The first abutment surface 36s faces an intermediate direction between the Z direction and the Y direction. The first abutment surface 36s abuts on an outer surface 56s of the scooping piece 56 (outer piece 56p) of the end plate 41.

A second abutment surface 36t perpendicular to the X direction is formed in the deepest portion of the scooping piece accommodation portion 36. The second abutment surface 36t abuts on the tip surface 56t of the scooping piece 56 (outer piece 56p) of the end plate 41.

As shown in FIG. 6A, the scooping piece accommodation portion 36 is widely formed so as to be closer to the outer peripheral surface of the block 21 than the guide piece accommodation portion 35. Accordingly, the scooping piece accommodation portion 36 can accommodate a member which is thicker than a member which can be accommodated in the guide piece accommodation portion 35. In other words, the member (scooping piece 56) accommodated in the scooping piece accommodation portion 36 is thicker than the member (guide piece 55) which is accommodated in the guide piece accommodation portion 35.

As shown in FIG. 6C, the guide piece accommodation portion 35 (bottom surface 35t) is formed so as to be more deeply in the X direction than the scooping piece accommodation portion 36 (second abutment surface 36t). Accordingly, when the end plate 41 is attached to the block 21, the guide piece accommodation portion 35 can accommodate the guide piece 55 before the scooping piece accommodation portion 36. In other words, when the end plate 41 is attached to the block 21, before the scooping piece 56 is accommodated in the scooping piece accommodation portion 36, the guide piece 55 is accommodated in the guide piece accommodation portion 35.

As shown in FIG. 6A, positioning members 37A and 37B facing the outside in the Y direction are provided on both sides (outer sides) of the screw hole 32 of the end surface 22A. The two positioning members (recessed portions, positioning portions) 37A and 37B are perpendicularly engraved in the +X direction from the end surface 22A, and are formed in parallel so as to be back to back to each other.

When the end plate 41 is attached to the block 21, the two positioning members 37A and 37B prevent (position) the movement in the Y direction and the rotation in the X direction of the end plate 41.

As shown in FIGS. 6A and 6C, inclined surfaces 38A and 38B which are gradually formed more deeply in the +X direction are provided on the outside of the two positioning members 37A and 37B in the Y direction.

The inclined surface 38A is formed so as to be connected to the positioning member 37A. The inclined surface 38B is formed so as to be connected to the bottom portions of the positioning member 37B and the recessed portion 25.

The thicknesses of the two inclined surfaces 38A and 38B are thicker than that of each of the guide piece 55 and the scooping piece 56 (center piece 56q). Since the inclined surfaces 38A and 38B are provided, the space in which the guide piece 55 and the scooping piece 56 (center piece 56q) are disposed increases. Accordingly, it is possible to thicken the guide piece 55 and the scooping piece 56 (center piece 56q).

Next, the detailed shape of the end plate 41 will be described with reference to FIGS. 8A and 8B.

Figure 8A:
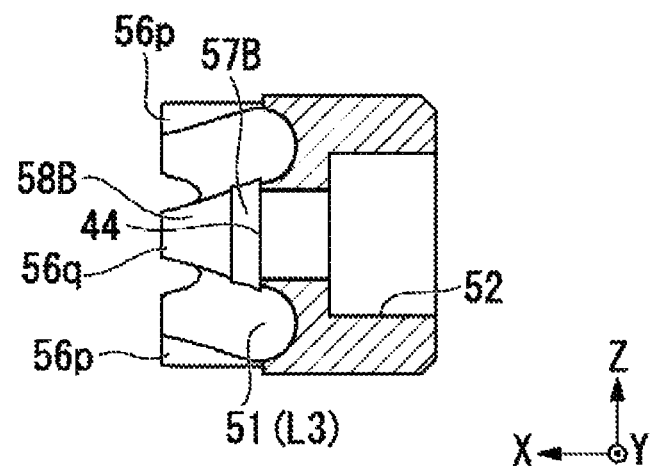
FIG. 8A is a sectional view taken along line IXa-IXa of the end plate 41 of FIG. 7D.
Figure 8B:
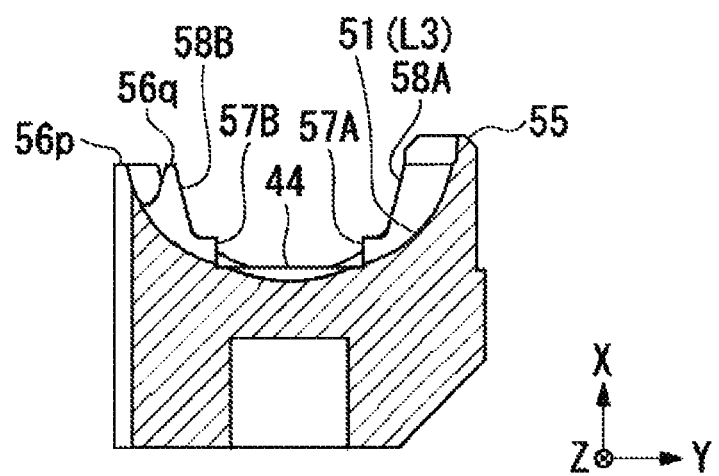
FIG. 8B is a sectional view taken along line IXb-IXb of the end plate 41 of FIG. 7D.

FIG. 8A is a sectional view taken along line IXa-IXa of the end plate 41 of FIG. 7D, and FIG. 8B is a sectional view taken along line IXb-IXb.

As shown in FIG. 7D, a bolt insertion hole 52 is provided at the center of the rear surface 44 of the end plate 41A. When the end plate 41 is attached to the block 21, a bolt (not shown) is inserted into the bolt insertion hole 52.

The direction-change passage outer peripheral surfaces 51 of the two roller direction-change passages L3 are opened (exposed) to the rear surface 44 in the Y direction. The two direction-change passage outer peripheral surfaces 51 are formed so as to be linearly symmetrical on both sides in the Z direction in the state where the bolt insertion hole 52 is interposed therebetween. The two direction-change passage outer peripheral surfaces 51 are bent in arc shapes. Each of the two direction-change passage outer peripheral surfaces 51 includes a linear shape (outer peripheral surface 51f) at the center of the rear surface 44 in the Y direction, and arc shapes (outer peripheral surfaces 51g) on the outer sides of the rear surface 44 in the Y direction.

The two direction-change passage outer peripheral surfaces 51 are formed so as to correspond to the two direction-change passage inner peripheral surface 31 of the block 21 one to one.

As shown in FIG. 8B, the direction-change passage outer peripheral surface 51 is a semicircular shape.

As shown in FIG. 7D, the outer peripheral surface 51f is engraved in the −X direction from the rear surface 44, and gradually protrudes in the +X direction toward the outside in the Y direction. The outer peripheral surface 51g protrudes in the +X direction further toward the outside in the Y direction.

As shown in FIGS. 7D and 8A, the direction-change passage outer peripheral surface 51 is gradually directed toward the center in the Z direction as it protrudes in the +X direction from the rear surface 44. That is, the two direction-change passage outer peripheral surfaces 51 are directed in a direction approaching each other.

As shown in FIG. 8B, when the direction-change passage outer peripheral surface 51 of the roller direction-change passage L3 is viewed in the Z direction, the direction-change passage outer peripheral surface 51 is bent in a semicircular curved shape.

As shown in FIG. 7D, when the direction-change passage outer peripheral surface 51 of the roller direction-change passage L3 is viewed in the X direction, the center (outer peripheral surface 51f) thereof is formed in a linear shape, and the outer side (outer peripheral surface 51g) thereof is bent in an arc shape.

As shown in FIG. 7D, a portion (guide piece 55) which is formed so as to protrude in the +X direction from the rear surface 44 is provided outside the outer peripheral surface 51g in the +Y direction side. The guide piece 55 is formed in a shape in which two arcs are connected to each other.

The guide piece 55 is a portion which is accommodated in the guide piece accommodation portion 35 of the above-described block 21.

Since the guide piece 55 is formed along the outer peripheral surface 51g, the guide piece 55 is formed to protrude so as to be gradually higher in the +X direction toward the outside in the Y direction (refer to FIG. 7B).

The outer surface 55s facing the outside in the Y direction is formed on the outer surface of the guide piece 55. The outer surface 55s is formed outside each of the adjacent direction-change passage outer peripheral surfaces 51, and is formed in an arc shape connected to each other. The outer surface 55s abuts on the sliding surface 35s of the guide piece accommodation portion 35 of the block 21.

The tip surface 55t facing the +X direction is formed on the tip of the guide piece 55. The tip surface 55t faces the bottom surface 35t of the guide piece accommodation portion 35 of the block 21.

As shown in FIGS. 7D and 8B, a portion (scooping piece 56) which is formed to protrude in the +X direction from the rear surface 44 is provided outside the outer peripheral surface 51g on the −Y direction side. The scooping piece 56 is disposed so as to be connected to the recessed portion 45 (refer to FIG. 4A).

The scooping piece 56 is formed in a ship bottom shape in which a gap in the Z direction gradually decreases toward the advancement direction of the ball 60. In the present embodiment, the scooping piece 56 includes two outer pieces 56p which are disposed on the outside in the Z direction and one center piece 56q which is disposed at the center in the Z direction, and the ship bottom shape is formed in two portions (refer to FIG. 4B).

The outer piece 56p is formed in an approximately J shape when viewed in the direction shown in FIG. 7D. The outer piece 56p is a portion which is accommodated in the scooping piece accommodation portion 36 of the above-described block.

The center piece 56q is formed in an approximately triangular shape when viewed in the direction shown FIG. 8B. The center piece 56q is a portion which is disposed along the inclined surface 38B of the above-described block.

The outer piece 56p and the center piece 56q are integrally provided with respect to each other.

As shown in FIG. 4B, a slit (scooping portion) 56v which is cut in the −X direction is provided between each outer piece 56p and each center piece 56q. In the scooping piece 56 in which the slit 56v is provided so as to protrude toward the block 21, the scooping piece 56 is formed such that the width of the scooping piece 56 is gradually narrowed toward the side opposite to the side to which the scooping piece 56 protrudes. In the present invention, two scooping pieces 56v corresponding to the multiple (two) endless circulation passages L are formed.

The ball 60 rolling on the load roller passage L1 of the block 21 is gradually transferred to the no-load roller passage L2 of the end plate 41 through the slit 56v. When the ball 60 is transferred from the load roller passage L1 to the no-load roller passage L2, the ball 60 advances to the slit 56v of the scooping piece 56 and is gradually scooped from the load roller passage L1.

As shown in FIG. 7D, since the scooping piece 56 is formed along the outer peripheral surface 51g, the scooping piece 56 is formed to protrude so as to be gradually higher in the +X direction toward the outside in the Y direction.

As shown in FIG. 7C, the outer surface 56s facing the outsides in the Z direction and the Y direction is formed on the outer surface of the outer piece 56p of the scooping piece 56. The first abutment surface (outer surface) 56s abuts on the first abutment surface 36s of the scooping piece accommodation portion 36 of the block 21.

As shown in FIG. 7B, the tip surface 56t facing the +X direction is formed on the tip of the outer piece 56p of the scooping piece 56.

The second abutment surface (tip surface) 56t abuts on the second abutment surface 36t of the scooping piece accommodation portion 36 of the block 21.

In this way, the outer piece 56p of the scooping piece 56 is covered with the scooping piece accommodation portion 36 of the block 21 in a state where the first abutment surface 56s abuts on the first abutment surface 36s and the second abutment surface 56t abuts on the second abutment surface 36t.

As shown in FIG. 7D, the outer piece 56p of the scooping piece 56 is formed so as to be thicker than the guide piece 55. As described above, the scooping piece accommodation portion 36 is formed so as to wider than the guide piece accommodation portion 35 (refer to FIG. 6A). Accordingly, the outer piece 56p of the scooping piece 56 can be thicker than the guide piece 55. Therefore, it is possible to increase strength of the outer piece 56p.

As shown in FIG. 7B, the guide piece 55 is formed so as to further protrude in the +X direction than the scooping piece 56. That is, the guide piece 55 on the no-load roller passage L2 is provided so as to further protrude than the scooping piece 56 on the load roller passage L1 side. Accordingly, when the end plate 41 is attached to the block 21, the guide piece 55 is accommodated in the guide piece accommodation portion 35 before the scooping piece 56 is accommodated in the scooping piece accommodation portion 36. Accordingly, when the end plate 41 is attached to the block 21, the guide piece 55 and the guide piece accommodation portion 35 function as guide mechanisms.

As shown in FIGS. 7D and 8B, positioned members 57A and 57B facing the center in the Y direction are provided at both sides (outer sides) in the Y direction of the bolt insertion hole 52 of the rear surface 44. The two positioned members (protrusion portion and positioning portion) 57A and 57B perpendicularly extends in the +X direction from the rear surface 44, and are formed to be parallel to each other so as to face front to front to each other.

When the end plate 41 is attached to the block 21, the two positioned members 57A and 57B respectively come into close contact with the positioning members 37A and 37B of the block 21. Accordingly, the movement in the Y direction and the rotation in the X direction of the end plate 41 are prevented (positioned).

As shown in FIGS. 7D and 8B, inclined surfaces 58A and 58B which gradually protrude in the +X direction are respectively provided on the outsides of the two positioned members 57A and 57B in the Y direction.

The inclined surface 58A is formed such that the positioned member 57A and the guide piece 55 are integrally connected with respect to each other.

The inclined surface 58B is formed such that the positioned member 57B and the center piece 56q of the scooping piece 56 are integrally connected with respect to each other.

The two inclined surfaces 58A and 58B are respectively formed along the inclined surfaces 38A and 38B of the block 21. Accordingly, it is possible to increase the thickness of each of the guide piece 55 and the scooping piece 56 (center piece 56q). Therefore, it is possible to increase strength of the guide piece 55 and the scooping piece 56 (center piece 56q).

Subsequently, a process in which the end plate 41 is attached to the block 21 will be described.

Figure 9A:
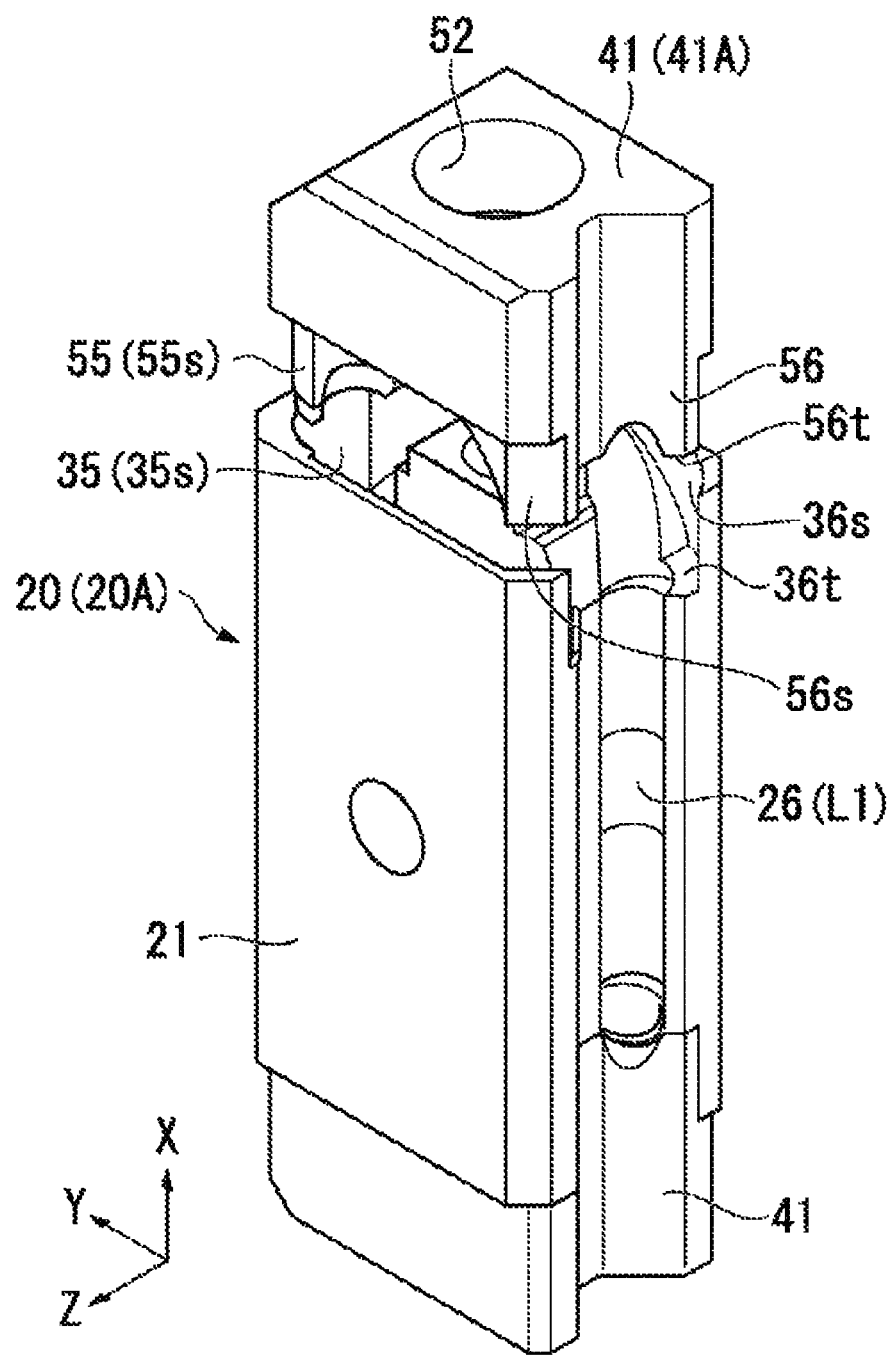
FIG. 9A is a view showing a process in which the end plate 41 is attached to the block 21.
Figure 9B:
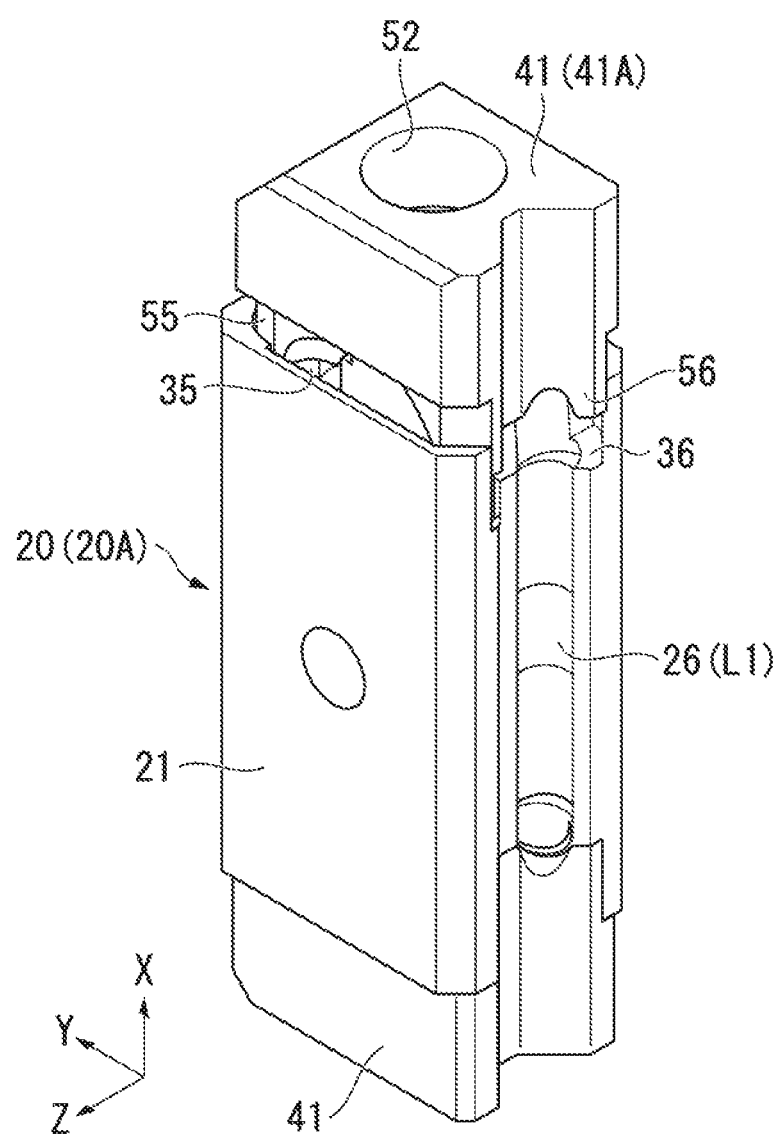
FIG. 9B is a view showing a process in which the end plate 41 is attached to the block 21.

FIGS. 9A and 9B are views showing the process in which the end plate 41 is attached to the block 21. The balls 60 are not shown in FIGS. 9A and 9B.

Hereinafter, first, a state where the end plate 41 is attached to the end surface 22 of the block 21 in the +X direction in advance will be described.

First, as shown in FIG. 9A, the block 21 is disposed on a workbench or the like in a state where the end plate 41 is positioned on the lower side.

Next, the multiple balls 60 are inserted into the endless circulation passage L from the roller rolling surface 26 and the through hole 27 opening to the end surface 22A of the block 21 in the −X direction. The multiple balls 60 are inserted (disposed) into the direction-change passage inner peripheral surface 31 of the roller direction-change passage L3 exposed to the end surface 22A of the block 21. The multiple balls 60 are disposed over the entire region of the endless circulation passage L.

Since the roller rolling surface 26 is formed in an arc shape having an angle exceeding 180°, the multiple balls 60 do not fall from the roller rolling surface 26 to the recessed portion 25 side.

Since the direction-change passage inner peripheral surface 31 of the block 21 is formed so as to be cut from the end surface 22A in the +X direction, before the end plate 41 is attached, the balls 60 do not fall from the direction-change passage inner peripheral surface 31.

The sliding surface 35s (guide piece accommodation portion 35) which is formed in a shape in which two arcs are connected to each other is provided on the outer peripheral side of the through hole 27. Accordingly, the ball 60 which has been inserted into one through hole 27 is not inserted into the other adjacent through hole 27. Since the ball 60 which has been inserted into one through hole 27 falls along the sliding surface 35s, the ball is not falsely inserted into the other adjacent through hole 27.

Finally, the end plate 41A is attached to the end surface 22A of the block 21.

When the end plate 41 is attached to the block 21, first, the guide piece 55 of the end plate 41 is directed to the guide piece accommodation portion 35 of the block 21, and the scooping piece 56 is directed to the scooping piece accommodation portion 36.

Next, if the end plate 41A moves toward the block 21 in the +X direction, before accommodation of the scooping piece 56 in the scooping piece accommodation portion 36 starts, accommodation of the guide piece 55 in the guide piece accommodation portion 35 starts. This is because the guide piece 55 is formed to protrude so as to be higher in the +X direction than the scooping piece 56.

If the end plate 41A moves in the +X direction toward the block 21, as shown in FIG. 9B, the outer surface 55s of the guide piece 55 come into slide-contact with the sliding surface 35s of the guide piece accommodation portion 35.

Accordingly, when the end plate 41A is attached to the block 21, the guide piece 55 and the guide piece accommodation portion 35 function as the guide mechanisms for accommodating the scooping piece 56 in the scooping piece accommodation portion 36.

Particularly, since the thickness of the outer piece 56p of the scooping piece 56 is thin, the outer piece 56p is easily damaged when the outer piece 56p is assembled. However, in the slider 20, the guide mechanism including the guide piece 55 and the guide piece accommodation portion 35 is provided in the end plate 41 and the block 21. Accordingly, it is possible to attach the end plate 41 to the end surface 22 of the block 21 without damaging the outer piece 56p of the scooping piece 56.

Next, the rear surface 44 of the end plate 41A abuts on the end surface 22 of the block 21.

Accordingly, the pair of positioned members 57A and 57B of the end plate 41A are fitted to the pair of positioning members 37A and 37B of the block 21. Since the positioned members 57A and 57B are fitted to the positioning members 37A and 37B, the end plate 41A is positioned to the block 21. Accordingly, the movement in the Y direction and the rotation in the X direction of the end plate 41A with respect to the block 21 are prevented.

In this way, the positioning members 37A and 37B provided between the adjacent direction-change passage inner peripheral surfaces 31 and the positioned members 57A and 57B provided between the adjacent direction-change passage outer peripheral surfaces 51 are engaged with each other, and the block 21 and the end plate 41 are positioned. Accordingly, the direction-change passage inner peripheral surface 31 and the direction-change passage outer peripheral surface 51 are overlapped so as to correctly face to each other, and the smooth roller direction-change passage L3 is formed. Since the roller direction-change passage L3 is correctly connected to the load roller passage L1 and the no-load roller passage 12, the endless circulation passage L without steps is formed.

Finally, a bolt (not shown) is inserted into the bolt insertion hole 52 of the end plate 41A and is screwed to the screw hole 32 of the block 21.

In this way, the end plate 41A is attached to the block 21.

If the end plate 41A is attached to the block 21, the outer surface 56s of the outer piece 56p of the scooping piece 56 abuts on the first abutment surface 36s of the scooping piece accommodation portion 36. Simultaneously the tip surface 56t of the outer piece 56p of the scooping piece 56 abuts on the second abutment surface 36t of the scooping piece accommodation portion 36.

When the multiple balls 60 circulate through the endless circulation passage L, the outer piece 56p of the scooping piece 56 receives forces directed to the outsides in the Y direction and the Z direction from the balls 60.

Since the thickness of the outer piece 56p of the scooping piece 56 is thin, if the outer piece 56p receives the forces from the balls 60, there is a concern that the outer piece 56p may be damaged (deformed). If the outer piece 56p is damaged, the balls 60 fall from the endless circulation passage L.

However, in the slider 20, the outer piece 56p of the scooping piece 56 is accommodated in the scooping piece accommodation portion 36 of the block 21. The outer surface 56s abuts on the first abutment surface 36s, and the tip surface 56t abuts on the second abutment surface 36t. Accordingly, even when the outer piece 56p of the scooping piece 56 receives the forces from the balls 60, the outer piece 56p is supported by the scooping piece accommodation portion 36 (first abutment surface 36s and second abutment surface 36t). Accordingly, the outer piece 56p is not damaged (deformed). In addition, the balls 60 do not fall from the endless circulation passage L.

The center piece 56q of the scooping piece 56 is not accommodated in the scooping piece accommodation portion 36. However, the inclined surface 38B is provided on the block 21. Accordingly, the center piece 56q can be formed so as to be gradually thickened toward the side opposite to the side on which the center piece 56q protrudes toward the block 21. Accordingly, even when the center piece 56q of the scooping piece 56 receives the forces from the balls 60, the center piece 56q is not damaged (deformed). Therefore, the balls 60 do not fall from the endless circulation passage L.

In the linear guide 1 according to the present embodiment, when the end plate 41A is attached to the block 21, the guide piece 55 and the guide piece accommodation portion 35 function as guide mechanism for accommodating the scooping piece 56 in the scooping piece accommodation portion 36. The outer piece 56p of the scooping piece 56 is easily damaged when the outer piece 56p is assembled. In contrast, in the present embodiment, the guide mechanism including the guide piece 55 and the guide piece accommodation portion 35 is provided. Accordingly, it is possible to attach the end plate 41 to the end surface 22 of the block 21 without damaging the outer piece 56p of the scooping piece 56.

In addition, since the pair of positioned members 57A and 57B formed on the end plate 41A are engaged with the pair of positioning members 37A and 37B of the block 21, the end plate 41 is positioned to the block 21. Accordingly, the direction-change passage inner peripheral surface 31 and the direction-change passage outer peripheral surface 51 are overlapped so as to correctly face to each other, and the smooth roller direction-change passage L3 is formed. In addition, the roller direction-change passage L3 is correctly connected to the load roller passage L1 and the no-load roller passage 12, and the endless circulation passage L without steps is formed. Accordingly, it is possible to improve assembling characteristics of the slider 20, and it is possible to prevent positional deviation between the block 21 and the end plate 41 due to a collision load or the like.

The shapes, the combinations, or the like of components shown in the above-described embodiment are exemplified, and various modifications may be applied to the present invention based on design requirements or the like within the scope which does not depart from the gist of the present invention.

The roller is not limited to the roller, and may be a ball. A retainer may not be provided.

Either the positioning members 37A and 37B or the positioned member 57A and 57B may be two surfaces parallel to each other. For example, instead of the positioned member 57B, a protrusion abutting on the positioning member 37B may be provided. In this case, the movement in the Y direction and the rotation in the X direction of the end plate 41 with respect to the block 21 are prevented (positioned).

The slider 20 (block 21 and end plate 41) may be suspended to the track rail 10 in a saddle shape.

The number of the endless circulation passages L is not limited to two, and for example, may be two or more such as four.

DESCRIPTION OF THE REFERENCE SYMBOLS

1: linear guide (movement device), 10: track rail (track body), 16: roller rolling surface, 20: slider (moving body), 21: block (moving body main body), 22: end surface, 31: direction-change passage inner peripheral surface (inner peripheral portion), 35: guide piece accommodation portion (circulation piece accommodation portion), 35s: sliding surface, 36: scooping piece accommodation portion (circulation piece accommodation portion), 36s: first abutment surface, 36t: second abutment surface, 37A and 37B: positioning member (recessed portion, positioning portion), 41: end plate (cover body), 44: rear surface (facing surface). 51: direction-change passage outer peripheral surface (outer peripheral portion), 55: guide piece, 55s: outer surface (guide surface), 56: scooping piece (circulation piece), 56v: slit (scooping portion), 57A and 57B: positioned member (protrusion portion, positioning portion), 60: ball (roller), L: endless circulation passage, L1: load roller passage, L2: no-load roller passage, L3: roller direction-change passage

The invention claimed is:

1. A movement device comprising:
a track body; and
a moving body which comprises: a plurality of endless circulation passages; and a roller configured to roll in the plurality of endless circulation passages, the moving body being movable relative to the track body via the roller disposed between the track body and the moving body, wherein
the moving body further comprises:
a moving body main body in which inner peripheral portions of roller direction-change passages configuring the adjacent endless circulation passages are formed to be adjacent to each other on an end surface in a movement direction in which the moving body moves; and
a cover body which is attached to the end surface of the moving body main body and in which outer peripheral portions of roller direction-change passages configuring the adjacent endless circulation passages are formed to be adjacent to each other, and wherein
the moving body main body and the cover body are positioned by engaging a positioning portion provided between the adjacent inner peripheral portions of the moving body main body with a positioning portion between the adjacent outer peripheral portions of the cover body.

2. The movement device according to claim 1, wherein one of the positioning portions includes a recessed portion which is provided on one of the moving body main body and the cover body; and
an other of the positioning portions includes a protrusion portion which is provided on an other of the moving body main body and the cover body and abuts on the recessed portion.

3. The movement device according to claim 2, wherein each of the endless circulation passages comprises a load roller passage, a no-load roller passage, and a circulation piece accommodation portion, the circulation piece accommodation portion being formed on at least one of the load roller passage and the no-load roller passage,
the cover body comprises a circulation piece which protrudes toward the moving body, forms a portion of the outer peripheral portion, and is accommodated in the circulation piece accommodation portion, and the protrusion portion is integrally provided with respect to the circulation piece.

4. The movement device according to claim 3, wherein
the no-load roller passage comprises the circulation piece accommodation portion in which the circulation piece is accommodated, and the circulation piece comprises arc-shaped guide surfaces which are formed outside the adjacent outer peripheral portions and are continuous to each other.

5. The movement device according to claim 4, wherein
both the load roller passage and the no-load roller passage comprise the circulation piece accommodation portion in which the circulation piece is accommodated, the circulation piece which is accommodated in the circulation piece accommodation portion of the load roller passage comprises a scooping portion which scoops the roller in the roller direction-change passage, and the circulation piece which is accommodated in the circulation piece accommodation portion of the no-load roller passage is provided to protrude from the circulation piece which is accommodated in the circulation piece accommodation portion of the load roller passage.

6. The movement device according to claim 3, wherein
both the load roller passage and the no-load roller passage comprise the circulation piece accommodation portion in which the circulation piece is accommodated, the circulation piece which is accommodated in the circulation piece accommodation portion of the load roller passage comprises a scooping portion which scoops the roller in the roller direction-change passage, and the circulation piece which is accommodated in the circulation piece accommodation portion of the no-load roller passage is provided to protrude from the circulation piece which is accommodated in the circulation piece accommodation portion of the load roller passage.

* * * * *